(12) United States Patent
Sun (10) Patent No.: US 10,713,674 B2
(45) Date of Patent: Jul. 14, 2020

(54) REDUCING SUBSTATION DEMAND FLUCTUATIONS USING DECOUPLED PRICE SCHEMES FOR DEMAND RESPONSE

(71) Applicant: Mitsubishi Electric Research Laboratories, Inc., Cambridge, MA (US)

(72) Inventor: Hongbo Sun, Lexington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 448 days.

(21) Appl. No.: 15/070,061

(22) Filed: Mar. 15, 2016

(65) Prior Publication Data

US 2017/0270548 A1 Sep. 21, 2017

(51) Int. Cl.
| | |
|---|---|
| *G06Q 30/02* | (2012.01) |
| *G06Q 50/06* | (2012.01) |
| *G06Q 10/10* | (2012.01) |
| *G06Q 20/10* | (2012.01) |
| *G06Q 10/06* | (2012.01) |
| *G05B 19/042* | (2006.01) |

(52) U.S. Cl.
CPC ....... *G06Q 30/0206* (2013.01); *G05B 19/042* (2013.01); *G06Q 50/06* (2013.01); *G05B 2219/2639* (2013.01); *Y04S 50/14* (2013.01); *Y04S 50/16* (2018.05)

(58) Field of Classification Search
CPC ........ G06Q 10/06; G06Q 10/10; G06Q 20/10; G06Q 50/06; G06Q 30/02
USPC ......................................... 705/7.35
See application file for complete search history.

(56) References Cited

U.S. PATENT DOCUMENTS

| | | |
|---|---|---|
| 8,068,938 B2 | 11/2011 | Fujita |
| 2002/0138176 A1 | 9/2002 | Davis et al. |
| 2009/0187499 A1 | 7/2009 | Mulder et al. |
| 2010/0106332 A1* | 4/2010 | Chassin .............. G06Q 20/102 700/278 |
| 2010/0211443 A1 | 8/2010 | Carrel et al. |
| 2011/0066300 A1 | 3/2011 | Tyagi et al. |
| 2016/0209857 A1* | 7/2016 | Nakasone ................ H02J 3/32 |

\* cited by examiner

*Primary Examiner* — Nga B Nguyen
(74) *Attorney, Agent, or Firm* — Gennadiy Vinokur; James McAleenan; Hironori Tsukamoto (57) ABSTRACT

A method reduces substation demand fluctuations using decoupled price scheme to mange load flexibility to follow renewable variations in a power distribution system. The price scheme includes base energy price component, up/down reserve usage price component, and up/down reserve usage variation price component. The operator adjusts the corresponding price components to achieve desired aggregated demand profile at a substation. Meanwhile, the operator determines the optimal amount of reduced loads, removed loads and transferred loads to minimize the total cost of substation power purchase, available but unused renewable penalty, and demand responses.

18 Claims, 4 Drawing Sheets

REDUCING SUBSTATION DEMAND FLUCTUATIONS USING DECOUPLED PRICE SCHEMES FOR DEMAND RESPONSE

FIELD OF THE INVENTION

This invention relates generally to power distribution systems, and more particularly to reducing substation demand fluctuations using decoupled price schemes for demand response.

BACKGROUND OF THE INVENTION

Power system operators are responsible for maintaining an instantaneous and continuous balance between supply and demand of power at transmission substations. This task is complicated by the increased presence of distributed energy resources (DERs), such as wind and solar generation, in the distribution system, which are fed by transmission substations. The unpredictable nature of these renewable energy sources leads to greater fluctuations in the amount of generated power available. Such fluctuations in generation capacity are present in addition to fluctuations in power demand.

To achieve a power balance in the presence of heightened volatility of energy resources, operators increase the use of reserve capacities, which are able to operate in load flowing mode. However, increasing power production by reserve units comes at the cost of reducing power production by more energy-efficient base-load generation units, reducing the environmental benefits of using renewable DERs.

Rather than relying on reserve units to act in load-following mode, there has been much interest on the topic of demand response, which adjusts loads in order to smooth out volatility in renewable generation capacity and power demand.

A variety of methods are known for reducing the load demands at specific periods through implementing demand response programs. For example, US 20110066300 provides a method for controlling load in a utility distribution network that initiates a shed event for a node in the distribution network by selecting premises associated with the node that are participating in a demand response program to reduce the load at the node to desired levels.

US 20100211443 utilizes demand response to reduce energy consumption by individual consumers by aggregating individual consumers, and providing feedback to such consumers regarding their energy consumption relative to other energy consumers in a group.

U.S. Pat. No. 8,068,938 describes a method for managing electrical demand on a power grid in response to electrical supply conditions which includes determining a first energy demand forecast using stored information, determining a first energy supply forecast based on a known energy production and transmission capacity, and comparing the first energy demand forecast to the first energy supply forecast. The method also includes transmitting at least one of an adjusted price signal and an electrical load shedding signal to a customer over a bi-directional communication system based on the comparison of the first energy demand forecast to the first energy supply forecast.

US 20020138176 provides means and methods for the automated aggregation and management of distributed electric load reduction. US 20090187499 provides a system, method and computer program product for providing demand response in a power grid. In one embodiment, the computer system can include a first module configured to store user profile data for a plurality of users in memory and wherein user profile data includes load shed participation data for at least some of the plurality of users, information identifying one or more load control devices associated with each of the plurality of users, and location data of a premises associated with the user. The system can include a second module configured to select a multitude of the users based, at least in part, on the load shed participation data of the profile data, a third module configured to transmit a first control message to a load control device of the selected users, wherein the control message comprises a request to reduce a load.

Most of existing methods are focused on how to reduce the peak demands and do not address how to smoothen the aggregated load curve at the substations to reduce the usage of reserve units. Therefore, there is a need for developing effective mechanism or techniques to reduce the substation load fluctuations.

SUMMARY OF THE INVENTION

Ideally, power generation, as a function of time, evolves smoothly. However, with increasing use of distributed generation sources, generation capacity fluctuations have significantly increased the volatility of substation demands. Instead of trying to control generation in order to smooth out this volatility, this invention uses a generation following mechanism to smooth fluctuations in substation demand, that is, the invention encourages a scheduling of flexible loads that closely follows variations in renewable generation. Under such a scheme, the transmission system is able to better utilize base-load generation units and operate at increased efficiency, and the distribution system is able to maximally utilize the renewable resources.

In particular, the embodiments of the invention decouple a substation price model with separate components for the base-load unit power production cost from the reserve unit power production cost, and the product cost of reserve units is further decoupled into total reserve usage cost and reserve usage variation cost between current and previous purchase intervals. Unlike conventional pricing models, which consider a single cost component, the result of using a decoupled pricing scheme is that in some cases it is favorable to increase demand in order to lower power costs at the substation. For example, when power demand is below a normal operating range, it can be financially advantageous to increase power demand, instead of using reserve units to achieve power balance.

In other cases, it is favorable to less variation of reserve usages between consecutive purchase intervals. For example, the product cost will be less if the amount of reserve usage at current purchase interval is close to usages at previous purchase interval. An important feature of the pricing scheme is that it depends on the total power purchased, and the amount of change in requested power compared to previous purchase intervals.

The operator can adjust the values of each component to achieve a desired aggregated demand profile for each substation if the demand fluctuations re beyond a pre-determined expectation. For example, if the aggregated demand profile is above a tolerated limit, then the operator can increase the up reserve price or/and lower upper normal threshold to pull demand back to or below the limit. Meanwhile, if the up reserves are changing more frequently or significantly among pricing intervals than expected, then the operator can increase the up reserve variation price to slow down or reduce the variations. In contract, the operator can increase the down reserve price or/and increase lower normal threshold to pull demand up to or above a tolerated limit if the aggregated demand profile is below the limit. When the down reserves are changing more frequently or significantly than expected, the operator can increase the down reserve variation price to slow down or reduce the variations.

In the invention, an optimization program is formulated to determine the optimal scheduling of flexible loads under decoupled prices for power purchase at substation subject to power flow, power balance, and other technical constraints. Both real-time and day-head markets are considered. The optimization problem formulation is solvable by computationally efficient linear programming methods.

DETAILED DESCRIPTION OF THE PREFERRED EMBODIMENTS

The embodiments of the invention provide a method for reducing substation demand fluctuations using decoupled price schemes of demand response. In particular, the embodiments of the invention decouple a substation price model with separate components for the base-load unit power production cost from the reserve unit power production cost.

Distribution System Modeling

Figure 1:
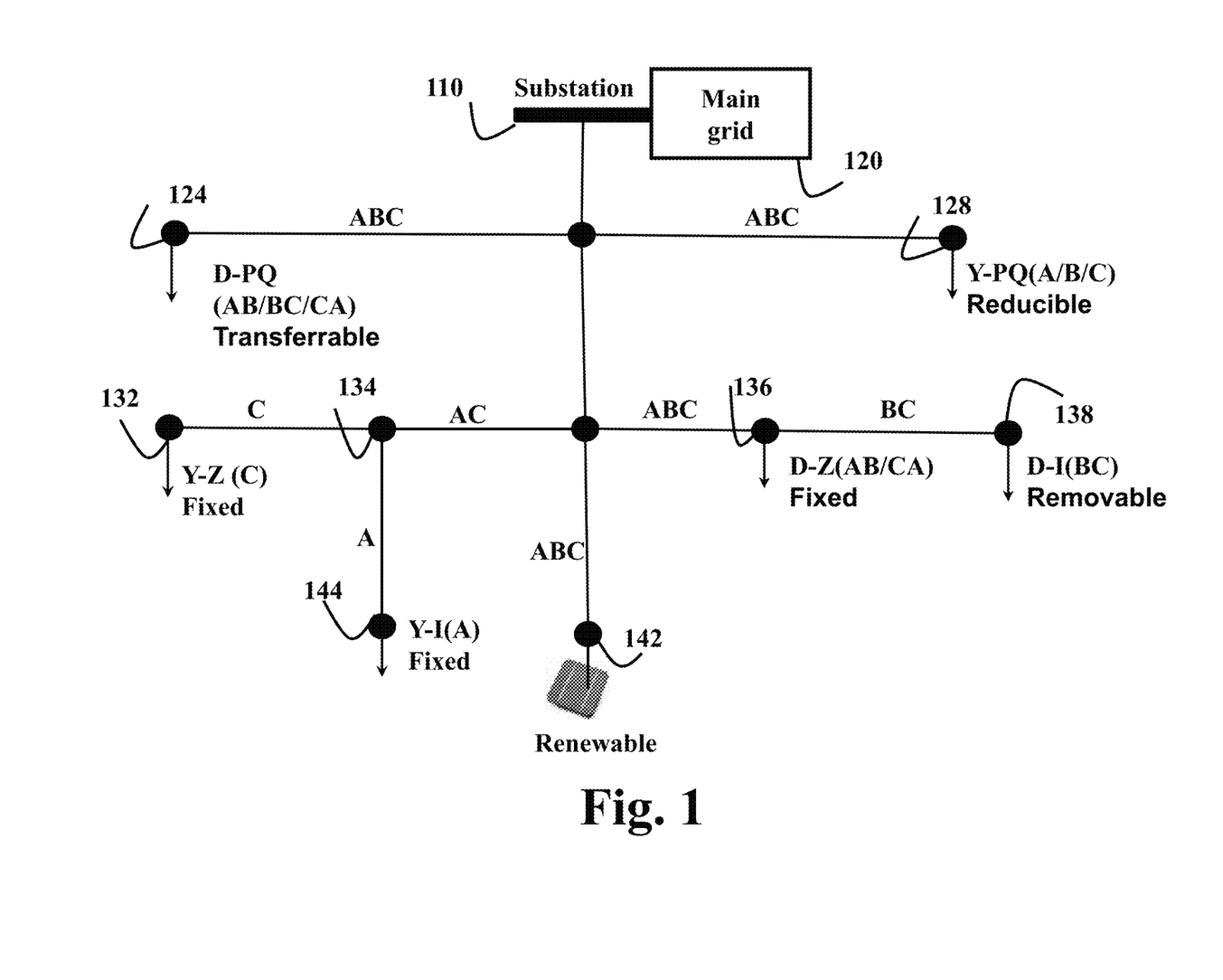
FIG. 1 is a schematic of an exemplar distribution system in which embodiments of the invention operate.

The method can be used in power distribution systems with significant renewable generations. FIG. 1 shows an example of such a distribution system. The system includes a substation bus 110, and a photovoltaic generation at bus 142. The substation bus 110 is connected to a main grid 120. Distribution operation is optimized based on the decoupled prices given at the bus 110.

A typical power distribution system is usually radial-configured, and its loads, branches or generations can be three-phase unbalanced. Therefore, each phase separately models during its operation and control. For example, the line between bus 136 and bus 138 only has two phases, phase B and phase C. Meanwhile, the line between bus 134 and bus 144 has only one phase A.

The loads can be connected to a bus either using DELTA-connection or WYE-connection, and each load can contain constant-power components, constant-current components, and constant-impedance components. There are three different types of loads for WYE-connected loads, including constant impedance Y-Z, constant power Y-PQ and constant current Y-I. Similarly, there are also three different types for DELTA-connected loads, including constant impedance D-Z, constant current D-I, and constant power D-PQ.

In FIG. 1, buses 128,144, and 132 are connected to constant power Y-PQ load, constant current Y-I load and constant impedance Y-Z load; and buses 124, 138, and 136 are connected to constant power D-PQ load, constant current D-I load and constant impedance D-Z load. Each load is an aggregated load that contains a group of load devices, and each load device can be controlled independently, or jointly. In this invention, all components are treated as constant powers and only active powers are considered.

The DELTA-connected loads are converted to equivalent WYE-connected ones. For example, for a load between phase x and phase y, $P_{D_{xy}}$ with a power factor, $\cos \phi_D$, the load can be connected as two equivalent loads at phase x and phase y, $P_{D_{xy-x}}$ and $P_{D_{xy-y}}$ as $$P_{D_{xy-x}} = \beta_D^+ P_{D_{xy}},$$

$$P_{D_{xy-y}} = \beta_D^- P_{D_{xy}}, \quad (1)$$

where $\beta_D^+$ and $\beta_D^-$ are conversion factors based on the load's power factor and ideal voltage relationship between three phases as follows:

$$\beta_D^+ = \frac{1}{2} + \frac{\sqrt{3}}{6} \tan\phi_D, \text{ and} \quad (2)$$

$$\beta_D^- = \frac{1}{2} - \frac{\sqrt{3}}{6} \tan\phi_D.$$

The equivalent load demands for any phase x that connected with both WYE-connected and DELTA-connected loads, $P_{EQD_x}$ can be determined as:

$$P_{EQD_x} = P_{D_x} + \beta_D^+ P_{D_{xy}} + \beta_D^- P_{D_{zx}}, \quad (3)$$

where $P_{D_x}$ is the loads at phase x, $P_{D_{xy}}$ and $P_{D_{zx}}$ are the loads between phase x and phase y, and phase z and phase x respectively.

The renewable generations can also be connected to a bus either using DELTA-connection or WYE-connection, and each generation can be regulated as constant active power and reactive power mode, or constant active power and constant voltage magnitude mode. In this invention, all generations are treated as constant active power and reactive power mode.

Similarly, DELTA-connected generations can be converted to equivalent WYE-connected ones as well. For example, for a generation between phase x and phase y, $P_{G_{xy}}$ with a power factor, $\cos \phi_G$, the load can be connected as two equivalent generations at phase x and phase y, $P_{G_{xy-x}}$ and $P_{G_{xy-y}}$ as $$P_{G_{xy-y}} = \beta_G^+ P_{G_{xy}},$$

$$P_{G_{xy-y}} = \beta_G^- P_{G_{xy}}, \quad (4)$$

where $\beta_G^+$ and $\beta^-$ are conversion factors based on the generation's power factor and ideal voltage relationship between three phases as follows:

$$\beta_G^+ = \frac{1}{2} + \frac{\sqrt{3}}{6} \tan\phi_G, \text{ and} \quad (5)$$

$$\beta_G^- = \frac{1}{2} - \frac{\sqrt{3}}{6} \tan\phi_G.$$

The power supply comes from the power injected by the transmission system at the substation and distributed generation sources at various locations in the power distribution system. In this invention, the renewable resources are fully utilized, unless there is network congestion, and there is a penalty for the unused amount of available renewable generations. The flexibility provided by the loads is optimally used to follow the changes of renewable generation to reduce the aggregated demand fluctuations at the substation. Both the day-ahead and real-time problems are described.

Figure 2:
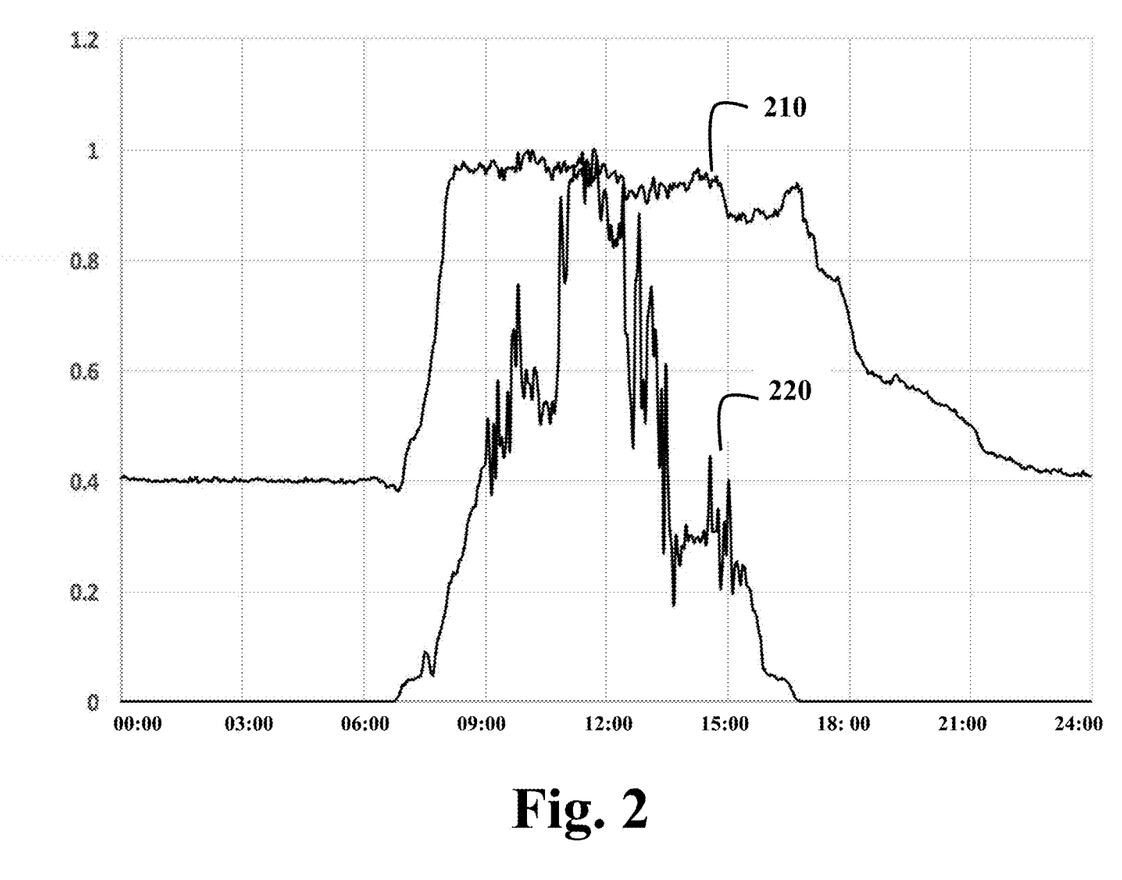
FIG. 2 is a schematic of load profile and renewable generation profile for a distribution system as used by according to embodiments of invention.

FIG. 2 shows an example for a 24-hour load profile 210 and a 24-hour photovoltaic (PV) generation profile 220 for the system shown in FIG. 1. The horizontal axis represents the sampling time for each interval, and the vertical axis represents the corresponding scaling factors for loads and generations at each interval with respect to the base generation and base load. One task for the operator is to optimally reshape the aggregated load profile with respect to the aggregated generation profile to maximally smoothen the demand fluctuations at the substation according to the decoupled price scheme.

Various characterizations of loads are considered depending on their flexibility in terms of changing how their demand is met. A load that can be removed partially or completely with a penalty cost is called a removable load. A load that can be reduced with inconvenience cost is called a reducible load. A load that can be deferred to a later time, or advanced to an earlier time is called a transferrable load. A load that is not available for demand response is called a fixed load that needs to be serviced immediately. In FIG. 1, loads at bus 128, bus 138 and bus 124 are reducible loads, removable loads, and transferrable loads respectively. All loads at other buses, such as loads at bus 132 are fixed loads.

Under a demand response scheme, a distribution system operator (DSO) can determine how to lower reducible loads, drop removable loads, and schedule transferrable loads in order to maintain smoother operations with respect to achieving power balance. Under different demand response scenarios, different values of power needed to be drawn at the substation level. There is a cost associated with drawing power at the substation level.

Figure 3:
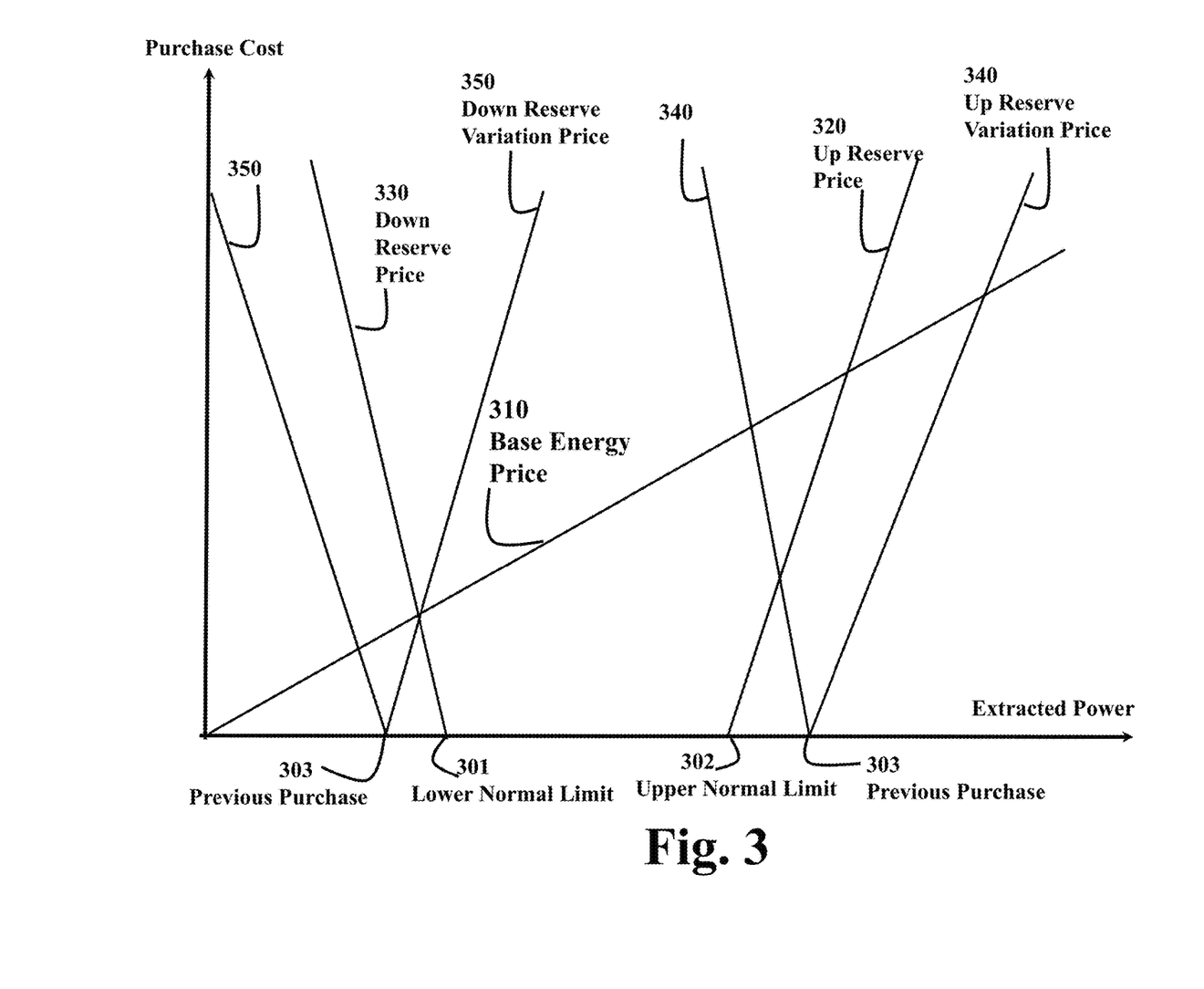
FIG. 3 is a schematic of decoupled price scheme for a substation according to embodiments of invention.

As shown in FIG. 3, a cost function is constructed as the sum of three separate pieces. The first component, 310 is a linearly increasing cost with respect to extracted power, which represents the base production cost ("Base Energy Price"). The second component, 320 or 330 is a piece-wise linear function that represents the cost of using reserves. The reserve cost is zero if the exacted power is within a normal usage range between a lower threshold, 301 and an upper threshold, 302, and away from this region, the costs increase linearly ("Down Reserve Price" and "Up Reserve Price"). The third component, 340 or 350 is also a piece-wise linear function that represents the cost function for variation of reserve usage between two consecutive pricing intervals. The third cost is zero if the amount of up/down reserve to be used at current pricing interval is at the same level as at previous pricing interval, 303. Otherwise the cost is increased with the absolute variation value of reserve usages ("Down Reserve Variation Price" and "Up Reserve Variation Price").

Since the production and reserve costs are given as three separate components, they are referred to a decoupled pricing scheme. The result of using the decoupled pricing scheme is that it is favorable to less reserve usage and less reverse usage variation. The pricing structure enables one to find demand response solutions that take advantage of this property.

Besides the above cost consideration, the distribution operation also requires that the system must be secure, that is the power flows on each branch of the system must be within its capacity. In this invention, the power flow of a power distribution system is modeled using a network flow model in which each phase of a bus is treated as an independent node, and each phase of a branch is treated as a losses branch with its flow only limited by its capacity. For a radial system, the active power flow can be easily determined after the load demands and renewable generations are given through a backward sweep procedure in which the active power flow on a phase of upstream branch is determined as the difference between the summation of all renewable generations on the phase downstream to the branch, and the summation of all load demands on the phase downstream to the branch.

B. Optimal Day-Ahead Operation Model

The schedule period of a day-ahead operation model is 24 hours. It includes several pricing intervals, and each pricing interval also includes several load and generation forecasting interval. The purpose of day-ahead model is to determine the operation schedule for each load and generation forecasting intervals with given prices for all pricing intervals of the next schedule period, i.e., 24 hours. It is assumed that the day-ahead prices are given at intervals, such as one hour, and the load and renewable forecasts given at relatively shorter intervals, such as 15 minutes. Therefore, each pricing interval contains multiple forecasting intervals. For example, prices and forecasts given at interval of 60 and 15 minutes, the day-ahead model will determine the generation and load control schedule for total of 96 15-minute-intervals.

The objective of the day-ahead model is to minimize the summation of purchase cost at the substation $C_S^{DA}$, available but unused renewable cost $C_R^{DA}$, demand response and power removing cost $C_D^{DA}$ for all forecasting intervals:

$$\text{Minimize } C_S^{DA} + C_R^{DA} + C_D^{DA}. \quad (6)$$

Assume H is the set of day-ahead pricing intervals, $Q_h$ is the set of day-ahead scheduling interval for each pricing interval h, and $\Phi_Y$ is the set of energized phases for WYE-connected generations or loads in the system, the substation purchase cost can be determined either as Eq. (7) if up and down reserve cost are given in term of consumed energy, or Eq. (8) if up and down reserve cost are given in term of used capacity:

$$C_S^{DA} = \sum_{h \in H} \sum_{q \in Q} \sum_{x \in \Phi_Y} \alpha_q \left( C_{S_{h,x}}^{BS} P_{S_{q,x}} + C_{S_{h,x}}^{UP} P_{S_{q,x}}^{UP} + C_{S_{h,x}}^{DN} P_{S_{q,x}}^{DN} \right) + \quad (7)$$

$$\sum_{h \in H} \sum_{x \in \Phi_Y} \left( C_{S_{h,x}}^{\Delta UP} |\Delta P_{S_{h,x}}^{UP}| + C_{S_{h,x}}^{\Delta DN} |\Delta P_{S_{h,x}}^{DN}| \right),$$

$$C_S^{DA} = \sum_{h \in H} \sum_{q \in Q_h} \sum_{x \in \Phi_Y} \alpha_q C_{S_{h,x}}^{BS} P_{S_{q,x}} + \quad (8)$$

$$\sum_{h \in H} \sum_{x \in \Phi_Y} \left( C_{S_{h,x}}^{UP} \max_{q \in Q_h} P_{S_{q,x}}^{UP} + C_{S_{q,x}}^{DN} \max_{q \in Q_h} P_{S_{q,x}}^{DN} + \right.$$

$$\left. C_{S_{h,x}}^{\Delta UP} |\Delta P_{S_{h,x}}^{UP}| + C_{S_{h,x}}^{\Delta DN} |\Delta P_{S_{h,x}}^{DN}| \right),$$

wherein $\alpha_q$ is the ratio of length of scheduling/forecasting interval over length of pricing interval, $P_{S_{q,x}}$ is the active power purchased at the substation through phase x at interval q and charged with base energy price for the pricing interval, $C_{S_{h,x}}^{BS}$; $P_{S_{q,x}}^{UP}$ and $P_{S_{q,x}}^{DN}$ are the consumed powers provided by up and down reserves, and determined as:

$$P_{S_{q,x}}^{UP} = \max\{0, P_{S_{q,x}} - \overline{P_{S_{h,x}}^{BS}}\},$$

$$P_{S_{q,x}}^{DN} = \max\{0, \underline{P_{S_{h,x}}^{BS}} - P_{S_{q,x}}\}, \quad (9)$$

wherein $\overline{P_{S_{h,x}}^{BS}}$ and $\underline{P_{S_{h,x}}^{BS}}$ are the given thresholds for the substation to be charged with additional up and down reserve prices, $C_{S_{h,x}}^{UP}$ and $C_{S_{h,x}}^{DN}$. $\Delta P_{S_{h,x}}^{UP}$ and $\Delta P_{S_{h,x}}^{DN}$ are the changes for consumed powers provided by up and down reserves between current and previous pricing intervals, and determined as (10) if the price is given by per energy consumption, or (11) if the price is given by per capacity usage:

$$\Delta P_{S_{h,x}}^{UP} = \sum_{q \in Q_h} \alpha_q P_{S_{q,x}}^{UP} - \sum_{q \in Q_{h-1}} \alpha_q P_{S_{q,x}}^{UP}, \quad (10)$$

$$\Delta P_{S_{h,x}}^{DN} = \sum_{q \in Q_h} \alpha_q P_{S_{q,x}}^{DN} - \sum_{q \in Q_{h-1}} \alpha_q P_{S_{q,x}}^{DN};$$

$$\Delta P_{S_{h,x}}^{UP} = \max_{q \in Q_h} P_{S_{q,x}}^{UP} - \max_{q \in Q_{h-1}} P_{S_{q,x}}^{UP}, \quad (11)$$

$$\Delta P_{S_{h,x}}^{DN} = \max_{q \in Q_h} P_{S_{q,x}}^{DN} - \max_{q \in Q_{h-1}} P_{S_{q,x}}^{DN};$$

$C_{S_{h,x}}^{\Delta UP}$ and $C_{S_{h,x}}^{\Delta DN}$ are the prices for the changes of up and down reserve usages, $Q_{h-1}$ is the set of scheduling interval for each pricing interval (h−1).

The prices are given per phase, and phase balancing can be managed through price signals.

Ignoring the operation cost for renewable, the renewable cost only includes the penalty for the available but unused energy:

$$C_R^{DA} = \sum_{h \in H} \sum_{q \in Q_h} \sum_{g \in DG} \alpha_q C_{G_g}^{UN} \left( \sum_{x \in \Phi_Y} P_{G_{g,q,x}}^{UN} + \sum_{xy \in \Phi_D} P_{G_{g,q,xy}}^{UN} \right), \quad (12)$$

wherein $\Phi_D$ is the set of energized phase pairs of DELTA-connected generations or loads in the system, DG is the set of distributed renewable generations, $P_{G_{g,q,x}}^{UN}$, $P_{G_{g,q,xy}}^{UN}$ and $C_{G_g}^{UN}$ are unused active power outputs of renewable generations at phase x, and between phase x and phase y, and penalty cost per unit for renewable g.

Neglecting the cost for managing the transferrable loads, the cost for flexible load control include inconvenience cost for responsive loads to voluntarily reduce its demand, and penalty cost for removable loads to shut off its power supply:

$$C_D^{DA} = \sum_{h \in H} \sum_{q \in Q_h} \sum_{d \in LDR} \left( \sum_{x \in \Phi_Y} \alpha_q C_{D_{d,q,x}}^{RD} P_{D_{d,q,x}}^{RD} + \right. \quad (13)$$

$$\left. \sum_{xy \in PHD} \alpha_q C_{D_{d,q,xy}}^{RD} P_{D_{d,q,xy}}^{RD} \right) +$$

$$\sum_{h \in H} \sum_{q \in Q_h} \sum_{d \in LDM} \left( \sum_{x \in \Phi_Y} \alpha_q C_{D_{d,q,x}}^{RM} P_{D_{d,q,x}}^{RM} + \sum_{xy \in \Phi_D} \alpha_q C_{D_{d,q,xy}}^{RM} P_{D_{d,q,xy}}^{RM} \right)$$

LDR and LDM are the set of reducible loads and removable loads. $P_{D_{d,q,x}}^{RD}$ and $P_{D_{d,q,x}}^{RM}$ are the voluntarily reduced and forced removed loads for WYE-connected load d at phase x. $P_{D_{d,q,xy}}^{RD}$ and $P_{D_{d,q,xy}}^{RM}$ are the voluntarily reduced and forced removed loads for DELTA-connected load d between phase x and phase y.

$C_{D_{d,q,x}}^{RD}$, $C_{D_{d,q,xy}}^{RD}$, $C_{D_{d,q,x}}^{RM}$ and $C_{D_{d,q,xy}}^{RM}$ are the unit costs for reduced and removed WYE or DELTA connected loads.

The power balances for all energized phases in the system are taken as the constraints. For each phase x at interval q, the system power balance equation can be described as:

$$\forall q \in Q_h, h \in H, x \in \Phi_Y: \quad (14)$$

$$P_{S_{q,x}} + \sum_{g \in DG} \left( P_{EQG_{g,q,x}} - P_{EQG_{g,q,x}}^{UN} \right) +$$

$$\sum_{d \in LDR} P_{EQD_{d,q,x}}^{RD} + \sum_{d \in LDM} P_{EQD_{d,q,x}}^{RM} =$$

$$\sum_{d \in \{LDF \cup LDR \cup LDM\}} P_{EQD_{d,q,x}} + \sum_{d \in LDT} \sum_{q' \in TF_q} P_{EQD_{d,q',q,x}}^{TF},$$

wherein LDF and LDT are the sets of fixed and transferrable loads, and $TF_q$ is the set of intervals that transferrable loads at other intervals can be deferred or advanced to interval q. $P_{EQG_{g,q,x}}$ and $P_{EQG_{g,q,x}}^{UN}$ are the equivalent active power outputs of available renewable generations, and available but unused renewable generations. $P_{EQD_{d,q,x}}^{RD}$ and $P_{EQD_{d,q,x}}^{RM}$ are the equivalent active powers of reduced and removed at phase x and interval q. $P_{EQD_{d,q,x}}^{TF}$ is the equivalent active power of load at phase x transferred from interval q' to interval q.

For transferable loads, power consumptions can be increased during the transferring. The energy balances among recovering periods for each load are defined as Eq. (15) for WYE-connected loads, or Eq. (16) for DELTA-connected loads:

$$\forall d \in LDT, q \in Q_h, h \in H: \quad (15)$$

$$\sum_{q' \in TO_q} P_{D_{d,qq',x}}^{TF} \eta_{d,qq',x} = P_{D_{d,q,x}}, \forall x \in \Phi_Y,$$

$$\sum_{q' \in TO_q} P_{D_{d,qq',xy}}^{TF} \eta_{d,qq',xy} = P_{D_{d,q,xy}}, \forall xy \in \Phi_D;$$

where $P_{D_{d,qq',x}}^{TF}$ and $\eta_{d,qq',x}$ are the active power of load at phase x transferred from interval q to interval q' and corresponding efficiency for transferring the load from interval q to interval q'. $P_{D_{d,qq',xy}}^{TF}$ and $\eta_{d,qq',xy}$ are the active power of load between phase x and phase y transferred from interval q to interval q' and corresponding efficiency for transferring the load from interval q to interval q'. $TO_q$ is the set of intervals that the transferable loads in interval q are transferred to.

The available but unused energy for a renewable is constrained by the available renewable output:

$\forall g \in DG, q \in Q_h, h \in H:$ $$P_{G_{g,q,x}}^{UN} \leq P_{G_{g,q,x}}, \forall x \in \Phi_Y,$$

$$P_{G_{g,q,xy}}^{UN} \leq P_{G_{g,q,xy}}, \forall xy \in \Phi_D; \quad (16)$$

wherein $P_{G_{g,q,x}}$ and $P_{G_{g,q,xy}}$ are the active power outputs of available renewable generations at phase x, and between phase x and phase y, respectively.

The constraints for allowed reduced and removed loads are defined as:

$$P_{D_{d,q,x}}^{RD} \leq \rho_{d,q,x}^{RD} P_{D_{d,q,x}}, \forall x \in \Phi_Y,$$

$$P_{D_{d,q,xy}}^{RD} \leq \rho_{d,q,xy}^{RD} P_{D_{d,q,xy}}, \forall xy \in \Phi_D; \quad (17)$$

$\forall d \in LDM, q \in Q_h, h \in H:$ $$P_{D_{d,q,x}}^{RM} \leq \rho_{d,q,x}^{RM} P_{D_{d,q,x}}, \forall x \in \Phi_Y,$$

$$P_{D_{d,q,xy}}^{RM} \leq \rho_{d,q,xy}^{RM} P_{D_{d,q,xy}}, \forall xy \in \Phi_D; \quad (18)$$

where $\rho_{d,q,x}^{RD}$ and $\rho_{d,q,xy}^{RD}$ are the maximum ratio of voluntarily load reductions for WYE-connected loads at phase x and DELTA-connected loads between phase x and phase y, $\rho_{d,q,x}^{RM}$ and $\rho_{d,q,xy}^{RM}$ are the maximum ratio of forced removed loads for WYE-connected loads at phase x and DELTA-connected loads between phase x and phase y.

Considering the complexity and dimension of the system, only the power flow limits for overloaded branches for the specific occurring phases and moments are considered. For any branch between bus i and bus j, its power flow can be determined as the sum of power injections for all buses upstream to its upstream bus, or downstream to its downstream bus. Accordingly, the power flow limits are described as:

$$\forall (i,j) \in DEV^{OV}, q \in Q_h^{OV}, h \in H^{OV}, x \in \Phi_Y^{OV};$$

$$-\overline{P_{ij,x}} \leq F_{ij,q,x}(BUS_{ij\text{-}DN}) \leq \overline{P_{ij,x}},$$

$$-\overline{P_{ij,x}} \leq F_{ij,q,x}(BUS_{ij\text{-}UP}) \leq \overline{P_{ij,x}}; \quad (19)$$

where $BUS_{ij\text{-}DN}$ and $BUS_{ij\text{-}UP}$ are the sets of buses upstream to the upstream bus of the branch between bus i and j, and downstream to downstream bus of the branch. $DEV^{OV}$, $Q_h^{OV}$, $H^{OV}$ and $\Phi_Y^{OV}$ are the sets of overloaded branches, scheduling intervals, pricing intervals, and phases. $\overline{P_{ij,x}}$ is the maximum allowed active power flow. $F_{ij,q,x}(BUS_c)$ is the sum of power injections for the set of buses, $BUS_c$, and defined as:

$$F_{ij,q,x}(BUS_c) = \delta_{BUS_c} P_{S_{q,x}} + \sum_{g \in DG_{BUS_c}} \left( P_{EQG_{g,q,x}} - P_{EQG_{g,q,x}}^{UN} \right) + \quad (20)$$

$$\sum_{d \in LDR_{BUS_c}} P_{EQD_{d,q,x}}^{RD} + \sum_{d \in LDM_{BUS_c}} P_{EQD_{d,q,x}}^{RM} -$$

$$\sum_{d \in \{LDF_{BUS_c} \cup LDR_{BUS_c} \cup LDM_{BUS_c}\}} P_{EQD_{d,q,x}} -$$

$$\sum_{d \in LDT_{BUS_c}} \sum_{q' \in TF_q} P_{EQD_{d,d',q,x}}^{TF}$$

$\delta_{BUS_c}$ is 0-1 variable, and equals to 1 when the substation is within the bus set, $DG_{BUS_c}$, $LDR_{BUS_c}$, $LDM_{BUS_c}$, $LDT_{BUS_c}$, and $LDF_{BUS_c}$ are the sets of renewable generations, reducible loads, removable loads, transferrable loads and fixed loads connected to buses in $BUS_c$.

In order to efficiently solve the above optimization problem, a candidate solution is initially set omitting the power flow limit constraints in (19). After this candidate solution is obtained, the power flow is calculated using the backward sweep method for radial power distribution systems mentioned above. If overloaded branches are present, the problem is resolved using power flow limit constraints on those overloaded branches, yielding a new solution. The process is repeated until a solution is obtained without any overloaded branches.

C. Optimal Real-Time Operation Model

The schedule period of a real-time operation model is less than an hour, such 15 minutes. It includes several pricing intervals, and each pricing interval also includes several load and generation forecasting intervals. The purpose of the real-time model is to determine the dispatch scheme for all load/generation forecasting intervals with given prices for all pricing intervals within next real-time schedule period. If the real-time prices are given at a small interval, such as 15 minutes, then the load and renewable forecasts can be given at much shorter intervals, such as 3 minutes. Therefore, the real-time model for 1 real-time pricing interval can include 5 real-time forecast intervals.

Similar to the day-ahead model, the objective to be minimized for a real-time model includes substation purchase cost, $C_S^{RT}$, unused renewable cost, $C_R^{RT}$, and demand control cost, $C_D^{RT}$:

$$\text{Minimize } C_S^{RT} + C_R^{RT} + C_D^{RT}. \quad (21)$$

The substation power purchase cost for a real-time pricing interval is given by Eq. (22) when prices are given in term of energy, or (23) when prices are given in terms of capacity:

$$C_S^{RT} = \sum_{q \in Q} \sum_{t \in T_q} \sum_{x \in \Phi_Y} \alpha_t \left( C_{S_{q,x}}^{BS} P_{S_{t,x}} + C_{S_{q,x}}^{UP} P_{S_{t,x}}^{UP} + C_{S_{q,x}}^{DN} P_{S_{t,x}}^{DN} \right) + \quad (22)$$

$$\sum_{q \in Q} \sum_{x \in \Phi_Y} \left( C_{S_{q,x}}^{\Delta UP} |\Delta P_{S_{q,x}}^{UP}| + C_{S_{q,x}}^{\Delta DN} |\Delta P_{S_{q,x}}^{DN}| \right),$$

$$C_S^{RT} = \sum_{q \in Q} \sum_{t \in T_q} \sum_{x \in \Phi_Y} \alpha_t C_{S_{q,x}}^{BS} P_{S_{t,x}} + \quad (23)$$

$$\sum_{q \in Q} \sum_{t \in T_q} \left( C_{S_{q,x}}^{UP} \max_{t \in T_q} P_{S_{t,x}}^{UP} + C_{S_{q,x}}^{DN} \max_{t \in T_q} P_{S_{t,x}}^{DN} \right) +$$

$$\sum_{q \in Q} \sum_{x \in \Phi_Y} \left( C_{S_{q,x}}^{\Delta UP} |\Delta P_{S_{q,x}}^{UP}| + C_{S_{q,x}}^{\Delta DN} |\Delta P_{S_{q,x}}^{DN}| \right),$$

where, Q and $T_q$ are the set of real-time pricing intervals, and the set of real-time forecasting intervals for pricing interval q. $\alpha_t$ is the ratio of length of forecast interval t over length of pricing interval. $C_{S_{q,x}}^{BS}$, $C_{S_{q,x}}^{UP}$ and $C_{S_{q,x}}^{DN}$ are the real-time prices for base energy usage, up and down reserve prices during the pricing interval q of phase x. $P_{S_{t,x}}$ is the extracted power from the substation at interval t and phase x. $P_{S_{t,x}}^{UP}$ and $C_{S_{q,x}}^{\Delta UP}$ are the additional power portions that are over up and below down normal usage thresholds, $\overline{P_{S_{q,x}}^{BS}}$ and $\underline{P_{S_{q,x}}^{BS}}$:

$$P_{S_{t,x}}^{UP} = \max\{0, P_{S_{t,x}} - \overline{P_{S_{q,x}}^{BS}}\},$$

$$P_{S_{t,x}}^{DN} = \max\{0, \underline{P_{S_{q,x}}^{BS}} - P_{S_{t,x}}\}, \quad (24)$$

where $\Delta P_{S_{q,x}}^{UP}$ and $\Delta P_{S_{q,x}}^{DN}$ are the changes for consumed powers provided by up and down reserves between current and previous real-time pricing intervals, and determined as (25) if the price is given by per energy consumption, or (26) if the price is given by per capacity usage:

$$\Delta P_{S_{q,x}}^{UP} = \sum_{t \in T_q} \alpha_t P_{S_{t,x}}^{UP} - \sum_{t \in T_{q-1}} \alpha_t P_{S_{t,x}}^{UP}, \quad (25)$$

$$\Delta P_{S_{q,x}}^{DN} = \sum_{t \in T_q} \alpha_t P_{S_{t,x}}^{DN} - \sum_{t \in T_{q-1}} \alpha_t P_{S_{t,x}}^{DN},$$

$$\Delta P_{S_{q,x}}^{UP} = \max_{t \in T_q} P_{S_{t,x}}^{UP} - \max_{t \in T_{q-1}} P_{S_{t,x}}^{UP}, \quad (26)$$

$$\Delta P_{S_{q,x}}^{DN} = \max_{t \in T_q} P_{S_{t,x}}^{DN} - \max_{t \in T_{q-1}} P_{S_{t,x}}^{DN},$$

$C_{S_{q,x}}^{\Delta UP}$ and $C_{S_{q,x}}^{\Delta DN}$ are the prices for the changes of up and down reserve usages, $T_{q-1}$ is the set of real-time forecasting intervals for pricing interval (q−1).

The renewable and demand control costs are defined as:

$$C_R^{RT} = \sum_{q \in Q} \sum_{t \in T_q} \sum_{g \in DG} \alpha_t C_{G_g}^{UN} \left( \sum_{x \in \Phi_Y} P_{G_g,t,x}^{UN} + \sum_{xy \in \Phi_D} P_{G_g,t,xy}^{UN} \right), \quad (27)$$

$$C_D^{RT} = \quad (28)$$
$$\sum_{q \in Q} \sum_{t \in T_q} \sum_{g \in LDR} \left( \sum_{x \in \Phi_Y} \alpha_t C_{D_{d,t,x}}^{RD} P_{D_{d,t,x}}^{RD} + \sum_{xy \in \Phi_D} \alpha_t C_{D_{d,t,xy}}^{RD} P_{D_{d,t,xy}}^{RD} \right) +$$
$$\sum_{q \in Q} \sum_{t \in T_q} \sum_{g \in LDM} \left( \sum_{x \in \Phi_Y} \alpha_t C_{D_{d,t,x}}^{RM} P_{D_{d,t,x}}^{RM} + \sum_{xy \in \Phi_D} \alpha_q C_{D_{d,t,xy}}^{RM} P_{D_{d,t,xy}}^{RM} \right),$$

$P_{G_g,t,x}^{UN}$, $P_{G_g,t,xy}^{UN}$ and $C_{G_g}^{UN}$ are the active powers of unused renewable generations at phase x and between phase x and phase y, and its unit cost. $P_{D_{d,t,x}}^{RD}$, $P_{D_{d,t,xy}}^{RD}$ and $C_{D_{d,t,x}}^{RD}$, $C_{D_{d,t,xy}}^{RD}$ are the reduced powers and relative costs for WYE and DELTA connected loads respectively. $P_{D_{d,t,x}}^{RM}$, $P_{D_{d,t,xy}}^{RM}$ and $C_{D_{d,t,x}}^{RM}$, $C_{D_{d,t,xy}}^{RM}$ are the removed powers and relative costs for WYE and DELTA connected loads respectively.

The real-time model considers the nodal power balance equations as its constraints. For any node i, the power balance equation is defined as follows:

$$\delta_i P_{S_{t,x}} - \sum_{g \in DG_i} \left( P_{EQG_{g,t,x}} - P_{EQG_{g,t,x}}^{UN} \right) + \quad (29)$$
$$\sum_{d \in LDR_i} P_{EQD_{d,t,x}}^{RD} + \sum_{d \in LDM_i} P_{EQD_{d,t,x}}^{RM} - \sum_{j \in BUS_i} P_{ij,t,x} =$$
$$\sum_{d \in \{LDF_i \cup LDR_i \cup LDM_i\}} P_{EQD_{d,t,x}} - \sum_{d \in LDT_i} \sum_{t' \in TF_t} P_{EQD_{d,t',t,x}}^{TF}$$

where, $\delta_i$ is 0-1 variable, and equals to 1 when the substation is located at bus i, $DG_i$, $LDR_i$, $LDM_i$, $LDT_i$, and $LDF_i$ are the sets of renewable, reducible loads, removable loads, transferrable loads and fixed loads at bus i. $TF_t$ is the set of intervals that transferrable loads at other intervals can be deferred or advanced to interval t. $BUS_i$ is the set of buses connected with bus i. $P_{EQG_{g,t,x}}$ and $P_{EQG_{g,t,x}}^{UN}$ are the equivalent active powers of available generations, and available but unused generations at generation g on phase X. $P_{EQD_{d,t,x}}$, and, $P_{EQD_{d,t,x}}^{RD}$ and $P_{EQD_{d,t,x}}^{RM}$ are the active powers of equivalent loads, reduced loads, and removed loads at load d on phase x. $P_{EQD_{d,t,x}}^{TF}$ is the active power of equivalent load transferred from internal t' to interval t at load d on phase x. $P_{ij,t,x}$ is the active power flowing on the branch between bus i and bus j at interval t and phase x, and limited by its capacity, $\overline{P_{ij,x}}$ according to:

$\forall ij \in DEV, t \in T_q, q \in Q, x \in \Phi_Y$:

$$-\overline{P_{ij,x}} \leq P_{ij,t,x} \leq \overline{P_{ij,x}}, \quad (19)$$

DEV is the set of branches in the system.

The unused energy for a renewable is constrained by is the available renewable output as:

$\forall g \in DG, t \in T_q, q \in Q$:

$$P_{G_g,t,x}^{UN} \leq P_{G_g,t,x}, \forall x \in \Phi_Y;$$

$$P_{G_g,t,xy}^{UN} \leq P_{G_g,t,xy}, \forall xy \in \Phi_D. \quad (31)$$

wherein $P_{G_g,t,x}$ and $P_{G_g,t,xy}$ are the active powers of available renewable generations at phase x and between phase x and phase y at forecasting interval t for generation g.

The constraints for allowed voluntarily reduced and forced removed loads are defined as:

$\forall d \in LDR, t \in T_q, q \in Q$:

$$P_{D_{d,t,x}}^{RD} \leq \rho_{d,t,x}^{RD} P_{D_{d,t,x}}, \forall x \in \Phi_Y;$$

$$P_{D_{d,t,xy}}^{RD} \leq \rho_{d,t,xy}^{RD} P_{D_{d,t,xy}}, \forall xy \in \Phi_D; \quad (32)$$

$\forall d \in LDM, t \in T_q, q \in Q$:

$$P_{D_{d,t,x}}^{RM} \leq \rho_{d,t,x}^{RM} P_{D_{d,t,x}}, \forall x \in \Phi_Y;$$

$$P_{D_{d,t,xy}}^{RM} \leq \rho_{d,t,xy}^{RM} P_{D_{d,t,xy}}, \forall xy \in \Phi_D; \quad (33)$$

where $\rho_{d,t,x}^{RD}$ and $\rho_{d,t,xy}^{RD}$, $\rho_{d,t,x}^{RM}$ and $\rho_{d,t,xy}^{RM}$ are the maximum ratio of voluntarily load reduction and forced removed loads for WYE and DELTA connected load d at interval t and phase x or between phase x and y.

For transferable loads, the energy balances among recovering periods for each load should be maintained:

$\forall d \in LDT, t \in T_q, q \in Q$: $\quad (34)$ $$\sum_{t' \in TO_t} P_{D_{d,tt',x}}^{TF} \eta_{d,tt',x} = P_{D_{d,t,x}}, \Phi_Y,$$

$$\sum_{t' \in TO_q} P_{D_{d,tt',xy}}^{TF} \eta_{d,tt',xy} = P_{D_{d,t,xy}}, xy \in \Phi_D,$$

where $P_{D_{d,tt',x}}^{TF}$ and $\eta_{d,tt',x}$ are the active power of load at phase x transferred from interval t to interval t' and corresponding efficiency for transferring the load from interval t to interval t'. $P_{D_{d,tt',xy}}^{TF}$ and $\eta_{d,tt',xy}$ are the active power of load between phase x and phase y transferred from interval t to interval t' and corresponding efficiency for transferring the load from interval t to interval t'. $TO_t$ is the set of intervals that transferable loads in interval t are transferred to. For real-time operation, the efficiency can set as 1.0 due to the short length of scheduling interval.

D. Procedure for Managing Flexible Loads Using Decoupled Price Model

Figure 4:
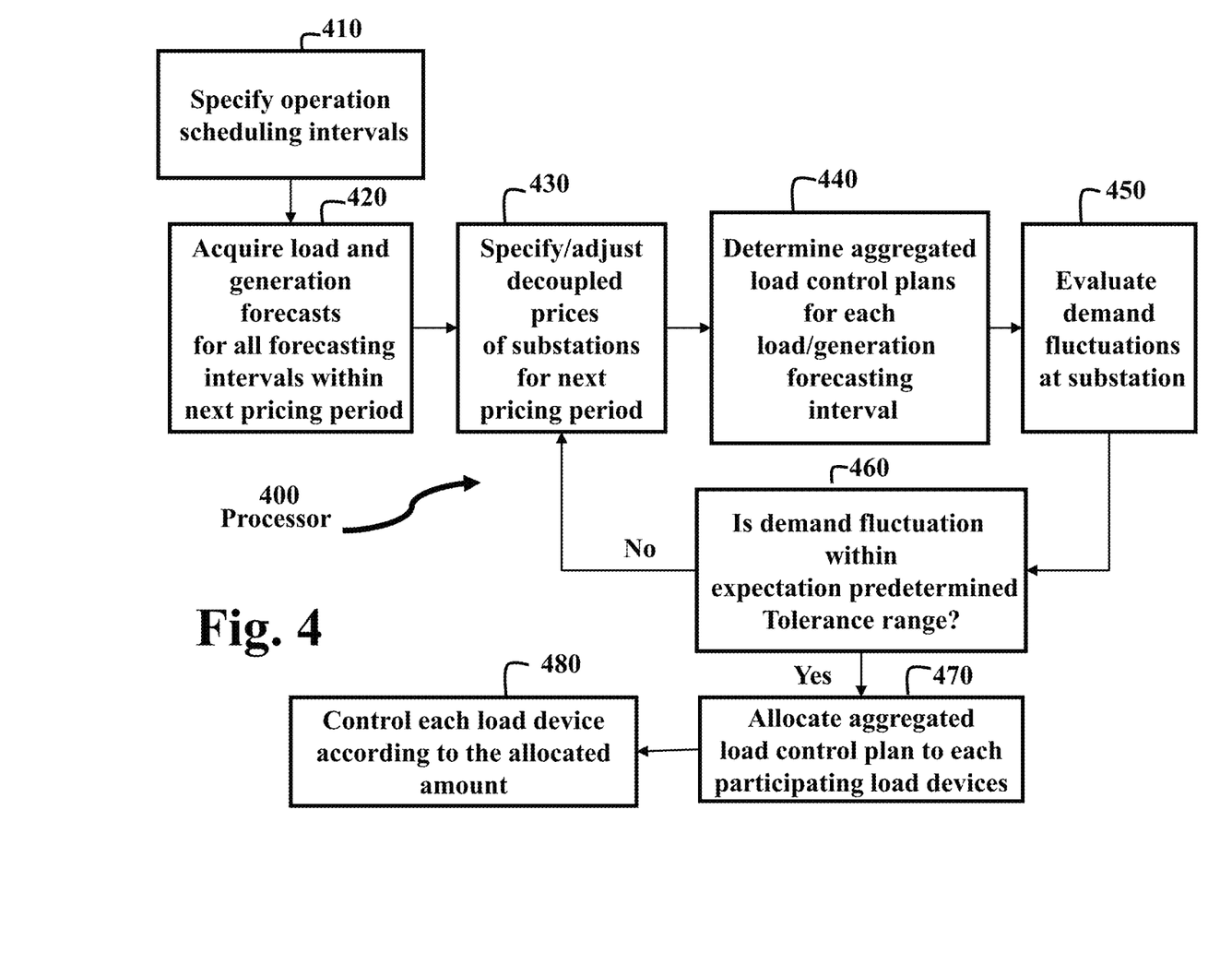
FIG. 4 is the block diagram of a method for reducing substation load demand fluctuations according to embodiments of invention.

FIG. 4 shows a block diagram of a method for reducing substation demand fluctuations by using decoupled prices to manage flexible loads according to one embodiment of the invention.

In step 410, decoupled price components for a substation of the power distribution system are specified for all pricing intervals of a next scheduling period. This includes specifying the scheduling period, the pricing interval, and forecasting interval for the power distribution system according a target operation mode. The operation is either a day-ahead mode, or a real-time mode. For example, for a day-ahead model, the scheduling period, pricing interval, and forecasting interval can be set as 24 hours, 60 minutes, and 15 minutes, The scheduling period, pricing interval, and forecasting interval for a real-time mode can be 15 minutes, 15 minutes, and 3 minutes, respectively.

In step 420, forecasts of load demands and renewable generations of the power distribution system for each forecasting intervals of the next scheduling period are acquired by a power distribution system operator, or a regional transmission operator.

In step 430, optimal load control plans for all aggregated loads with flexibility for each forecasting interval of next scheduling period are determined. This includes separate price components for each substation during all pricing intervals of the next scheduling period.

In step 440, the power distribution system operator determines aggregated load control plans for each flexible load at each forecasting interval using the model described above.

In step 450, the independent system operator or regional transmission operator evaluates the aggregated demand fluctuations at the substation based on the load control plans from the power distribution system.

In step 460, the results of substation demand fluctuations are checked against a pre-determined tolerance range. If it is within the given range, go to step 470. Otherwise, go to step 430 to re-specify the price components for corresponding substation.

In step 470, the aggregated load control plans for the power distribution system are then allocated to each participating load devices in the system.

In step 480, each load device is controlled according to the allocated amount of powers.

The above steps can be performed in a processor 100 connected to memory and input and output interfaces by busses as known in the art.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for controlling an amount of power at a substation of a power distribution system (PDS), comprising steps:
    providing an amount of renewable generation to the substation of PDS using buses that inject renewable energy into the PDS using a transmission system at the substation for sharing renewable energy consumption between a predetermined number of load devices based upon predetermined aggregated load control plans to each load device to the substation of the PDS for a scheduling period;
    identifying from the scheduling period if situations in which an aggregated demand at the substation exceeds a predetermined limit, and upon determination of the aggregated demand exceeding the predetermined limit, then determine for a next scheduling period aggregate load control plans to each load device to the substation of the PDS in which an aggregated demand at the substation does exceed the predetermined limit for the next scheduling period, wherein the aggregated demand for the next scheduling period is determined based on an energy demand of each load device and an amount of availability of renewable energy from the renewable generation;
    determining the aggregate load control plans for each load device to the substation of the PDS for the next scheduling period, based on
        specifying decoupled price components for the substation of the PDS for all pricing intervals of the next scheduling period;
        acquiring forecasts of load demands and renewable generations of the PDS for each forecasting intervals of the next scheduling period;
        determining load control plans for all aggregated loads with flexibility for each forecasting interval of the next scheduling period, wherein the load control plans are optimal;
        evaluating demand fluctuations at the substation based on the load control plans, and adjusting decoupled price components for the substation until the demand fluctuations at the substation are within a tolerance range;
        allocating the aggregated load control plans to each load device of the substation of the PDS so the aggregated demand at the substation does not exceed the predetermined limit for the next scheduling period; and
    controlling an amount of power at the substation of the PDS for the next scheduling period by controlling each load device of the substation of the PDS based on adjusting an amount of power consumption and an amount of operation time of the load device during the next scheduling period according to the aggregated load control plans by lowering reducible loads, dropping removable loads and scheduling transferrable loads, according to the aggregate load control plans for each load device of the substation of the PDS, wherein the steps are performed in a processor connected to a memory, an input interface and an output interface.

2. The method of claim 1, wherein each scheduling period includes at least one pricing intervals, each pricing interval includes at least one load and generation forecasting interval, and the PDS includes a substation, at least one load with flexibility, at least one renewable generation and radially configured.

3. The method of claim 1, wherein a set of decoupled price components is specified for the substation for each pricing interval of the next scheduling period, including:
    a base energy price component used to charge for an active power extracted from the substation by the PDS,
    an up reserve price component used to charge for an up reserve usage when the active power extracted from the substation is above an upper limit of a pre-determined normal range, where the up reserve usage is determined as a difference between active power extracted from the substation and the upper limit,
    a down reserve price component used to charge for a down reserve usage when the active power extracted from the substation is below a lower limit of the pre-determined normal range, where the down reserve usage is determined as a difference between the lower limit and the active power extracted from the substation,
    an up reserve variation price component used to charge for an up reserve usage variation between two consecutive pricing intervals, where the up reserve usage variation is determined as an absolute value of a difference between the up reserve usage at a current pricing interval and the up reserve usage at a previous pricing interval, and
    a down reserve variation price component used to charge for a down reserve usage variation between two consecutive pricing intervals, where the down reserve usage variation is determined as an absolute value of a difference between the down reserve usage at current pricing interval and the down reserve usage at previous pricing interval.

4. The method of claim 2, wherein the load with flexibility is a reducible load with a demand reduced with an inconvenience cost, a removable load with a demand partially or completely removed with a penalty cost, a transferrable load with a demand deferred to a later time or advanced to an earlier time within the scheduling period, and the demand is increased when transferred to other interval, and wherein the load control plan specifies an amount of active power reduction for each reducible load, the amount of active power drop for each removable load, and a transferred intervals and an amount of transferred active powers for each transferrable load; and a load is connected to a bus with WYE-connection or DELTA-connection.

5. The method of claim 4, wherein a DELTA-connected load between phases is be converted to equivalent WYE-connected loads at each phase according to a power factor, $\cos \phi_D$ according to:

$$P_{D_{xy\text{-}x}} = \beta_D^+ P_{D_{xy}}, P_{D_{xy\text{-}y}} = \beta_D^- P_{D_{xy}},$$

$$\beta_D^+ = \frac{1}{2} + \frac{\sqrt{3}}{6}\tan\phi_D, \beta_D^- = \frac{1}{2} - \frac{\sqrt{3}}{6}\tan\phi_D,$$

wherein $P_{D_{xy}}$ is the active power of the DELTA-connected load between phase x and phase y, $P_{D_{xy\text{-}x}}$ and $P_{D_{xy\text{-}y}}$ are the active powers of equivalent loads at phase x and phase y, $\beta_D^+$ and $\beta_D^-$ are conversion factors.

6. The method of claim 2, wherein an available generation of the renewable generation is maximally used and a penalty cost is applied when there are unused but available renewable generation present, and the renewable generation is connected to a bus with WYE-connection or DELTA-connection.

7. The method of claim 6, wherein a DELTA-connected renewable generation between phases can be converted to equivalent WYE-connected renewable generations at each phase according to a power factor, $\cos \phi_G$ according to:

$$P_{G_{xy\text{-}x}} = \beta_G^+ P_{G_{xy}}, P_{G_{xy\text{-}y}} = \beta_G^- P_{G_{xy}},$$

$$\beta_G^+ = \frac{1}{2} + \frac{\sqrt{3}}{6}\tan\phi_G, \beta_G^- = \frac{1}{2} - \frac{\sqrt{3}}{6}\tan\phi_G,$$

wherein $P_{G_{xy}}$ is the active power of the DELTA-connected renewable generation between phase x and phase y, $P_{G_{xy\text{-}x}}$ and $P_{G_{xy\text{-}y}}$ are active powers of equivalent renewable generations at phase x and phase y, $\beta_G^+$ and $\beta_G^-$ are conversion factors.

8. The method of claim 1, where the load control plans for all aggregated loads with flexibility are determined by minimizing a summation of power purchase cost at the substation $C_S$, penalty cost for available but unused renewable $C_R$, control cost for demand response and removal $C_D$, for all forecasting intervals of the scheduling period, wherein the minimizing is according to:

Minimize $C_S + C_R + C_D$ wherein the substation purchase cost $C_S$ is determined as a summation of a product of active power extracted at the substation and a unit base energy price, a product of the up reserve usage and the unit up reserve price, a product of the down reserve usage and the unit down reserve price, a product of the up reserve usage variation and a unit up reserve variation price, and a product of the down reserve usage variation and the unit down reserve variation price over all forecasting intervals, and the unused renewable cost $C_R$ is determined as a product of the active power of the unused renewable generation and a unit penalty cost over all forecasting intervals, and the demand response control cost $C_D$ is determined as a summation of the product of the reduced active power and a unit inconvenience cost of the reducible load, a product of removed active power and a unit penalty cost of the removable load.

9. The method of claim 8, where the price the for unit up and down reserve usage, and the price for the unit up and down reserve usage variation are given in term of consumed energy at each pricing interval, and the up and down reserve usage and corresponding variation are determined as a summation of corresponding reserve usage or variation at each forecasting interval weighted by a ratio of a length of the forecasting interval over a length of the pricing interval.

10. The method of claim 8, where the price for unit up and down reserve usage, and the price for unit up and down reserve usage variation are given in term of used power capacity at each pricing interval, and the up and down reserve usage and corresponding variation are determined as a maximum of corresponding reserve usages or variations for all forecasting intervals of the pricing interval.

11. The method of claim 1, where load control plans for all aggregated loads with flexibility are determined by satisfying following constraints, including:
power balancing for each phase;
power flow limitation for each branch at each phase;
energy balancing for each transferable load at the phase or a phase pair;
maximum unused active power for each renewable generation at the phase or the phase pair;
maximum allowed reduced active power for each reducible load at the phase or the phase pair; and
maximum allowed dropped active power for each removable load at a phase or a phase pair.

12. The method of claim 11, power balancing for each phase is defined as for each bus of the PDS, an equivalent active power injected into the bus at the phase is be equal to the an equivalent active power extracted from the bus and the phase, the active power can be injected from the substation, a renewable generation or a branch connected to the bus, the active power can be exacted from the bus and the phase by a load or a branch connected to the bus; the generations and loads between phases are converted to equivalent generations and loads at corresponding phases.

13. The method of claim 12, power balancing for each phase is simplified as for the PDS, the equivalent active power injected into the PDS at the phase must be equal to the equivalent active power extracted from the PDS and the phase, the active power is injected from the substation, and the renewable generations; the active power is exacted from the PDS and the phase by the loads, and the generations and loads between phases are converted to equivalent generations and loads at corresponding phases.

14. The method of claim 11, power flow limitation for each branch at each phase is defined as active powers flowing on the branch through an upstream-bus and an downstream-bus of the branch on the phase are less than a capacity of the phase, active power flow flowing on the branch through the upstream-bus of the branch at the phase is determined as a summation of active power injections for all buses upstream to the upstream-bus of the branch, active power flow flowing on the branch through the downstream-bus of the branch at the phase is determined as a summation of active power injections for all buses downstream to the downstream-bus of the branch, and active power injection of a bus is determined a difference between a summation of active power injected from the substation and the available renewable generation connected to the bus and the phase, and a summation of active power extracted by all loads connected to the bus and the phase, and the generations and loads between phases are converted to equivalent generations and loads at corresponding phases.

15. The method of claim 11, energy balancing for each transferable load at the phase or a phase pair is defined as for the transferable load at the phase at a forecasting interval, active power of the load at the forecasting interval should be equal to a summation of active powers of equivalent loads transferred to other forecasting intervals, weighted by corresponding efficiencies for transferring load from the forecasting interval to other forecasting intervals.

16. The method of claim 1, wherein an optimization problem for determining the load control plans is solved using the following steps:
    determining a candidate solution by omitting the constraints of power flow limitations;
    calculating the power flows after the candidate solution is obtained; and
    checking if overloaded branches are present, and if yes, resolving the optimization problem using the constraints of power flow limitation on the overloaded branches, and yielding a new solution;
    repeating the process until a solution is obtained without any overloaded branches.

17. The method of claim 1, further comprising:
    adjusting the decoupled prices with respect to corresponding aggregated demand fluctuations, and further comprising:
    determining an aggregated demand profile at the substation by applied the load control plans to the PDS;
    increasing the up reserve price and decreasing the upper limit of the pre-determined normal range when the aggregated demand profile is above a pre-determined upper threshold;
    increasing the up reserve variation price when the up reserve usage variation among pricing intervals is above a pre-determined threshold;
    increasing the down reserve price and the lower limit of the pre-determined normal range when the aggregated demand profile is below a pre-determined lower threshold; and
    increasing the down reserve variation price when the down reserve usage variation among pricing intervals is above a pre-determined threshold.

18. A system for controlling power balancing at a substation of a power distribution system (PDS), comprising:
    a memory and input interface connected to a processor, the processor is configured to
      provide an amount of renewable generation to the substation of PDS using buses that inject renewable energy into the PDS using a transmission system at the substation for sharing renewable energy consumption between a predetermined number of load devices based upon predetermined aggregated load control plans to each load device to the substation of the PDS for a scheduling period;
    identifying from the scheduling period if situations in which an aggregated demand at the substation exceeds a predetermined limit, and upon determination of the aggregated demand exceeding the predetermined limit, then determine for a next scheduling period aggregate load control plans to each load device to the substation of the PDS in situations in which an aggregated demand at the substation exceeds a predetermined limit, wherein the aggregated demand is determined based on an energy demand of each load device and an amount of availability of renewable energy from the renewable generation;
    determine the aggregate load control plans for each load device to the substation of the PDS for the next scheduling period, based on
      specify decoupled price components for the substation of the PDS for all pricing intervals of the next scheduling period;
      acquire forecasts of load demands and renewable generations of the PDS for each forecasting intervals of the next scheduling period;
      determine load control plans for all aggregated loads with flexibility for each forecasting interval of the next scheduling period, wherein the load control plans are optimal;
      evaluate demand fluctuations at the substation based on the load control plans, and adjusting decoupled price components for the substation until the demand fluctuations at the substation are within a tolerance range;
      allocate, using an output interface connected to the processor, the aggregated load control plans to each load device of the substation of the PDS so the aggregated demand at the substation does not exceed the predetermined limit for the next scheduling period; and
      control an amount of power at the substation of the PDS for the next scheduling period by controlling each load device at the substation of the PDS based on adjusting an amount of power consumption and an amount of operation time of the load device during the next scheduling period according to the aggregated load control plans by lowering reducible loads, dropping removable loads and scheduling transferrable loads, according to the aggregate load control plans for each load device of the substation of the PDS.

* * * * *